United States Patent
Stehle et al.

(10) Patent No.: US 7,295,595 B2
(45) Date of Patent: Nov. 13, 2007

(54) DEVICE FOR SYNCHRONIZING A RECEIVER AND A TRANSMITTER IN A COMMUNICATION SYSTEM

(75) Inventors: Caroline Stehle, Antibes (FR); Michael Kohlmann, Fuerth (DE)

(73) Assignee: NXP B.V., Eindhoven (NL)

( * ) Notice: Subject to any disclaimer, the term of this patent is extended or adjusted under 35 U.S.C. 154(b) by 615 days.

(21) Appl. No.: 10/474,785

(22) PCT Filed: Apr. 18, 2002

(86) PCT No.: PCT/IB02/01244

§ 371 (c)(1),
(2), (4) Date: Oct. 14, 2003

(87) PCT Pub. No.: WO02/089347

PCT Pub. Date: Nov. 7, 2002

(65) Prior Publication Data

US 2004/0131031 A1    Jul. 8, 2004

(30) Foreign Application Priority Data

Apr. 19, 2001    (EP)    ................... 01401009

(51) Int. Cl.
*H04B 1/713* (2006.01)
(52) U.S. Cl. ................ 375/147; 370/210; 370/320; 370/324; 370/479; 370/503
(58) Field of Classification Search .......... 370/330, 370/350; 375/130, 142, 147, 152
See application file for complete search history.

(56) References Cited

U.S. PATENT DOCUMENTS 4,701,934 A * 10/1987 Jasper ...................... 375/147

FOREIGN PATENT DOCUMENTS

| EP | 0892528 A2 | 1/1999 |
|---|---|---|
| WO | 0044117 A2 | 7/2000 |

OTHER PUBLICATIONS

Bian, Y.Q., Nix, A.R.; Channel adaptive multiple access and intersymbol interference cancellation techniques for TDD-mode UMTS receivers; Mar. 26-28, 2001 ; Second International Conference on 3G Mobile Communication Technologies.*

* cited by examiner

*Primary Examiner*—David C. Payne
*Assistant Examiner*—Adolf DSouza

(57) ABSTRACT

The present invention relates to a device (D) and an associated method for the synchronization of a DS-CDMA receiver with a synchronization code being sent periodically and discontinuously by a DS-CDMA transmitter. Said device (D) comprises partial correlation calculation means (PC) for applying partial correlation to the received sequence of data and for providing output correlation signals, transform computation means (FFT8) with half inputs being zeros for applying a transform to said output correlation signals and for providing complex output signals, a square absolute value circuit (SQUARE) for calculating the square of absolute values of said complex output signals, slot-wise non-coherent integration means (INT) for applying a non-coherent integration to said square absolute values, and, selecting means (SELMAX) for selecting a maximum from the integrated values. Thus, with the maximum selected, a slot timing and a frequency offset estimate are determined for the synchronization.

12 Claims, 3 Drawing Sheets

DEVICE FOR SYNCHRONIZING A RECEIVER AND A TRANSMITTER IN A COMMUNICATION SYSTEM

FIELD OF THE INVENTION

The present invention relates to a device for the synchronization of a Direct Sequence-Code-Division Multiple Access (DS-CDMA) receiver with a synchronization code being sent periodically and discontinuously by a DS-CDMA transmitter. The present invention also relates to an associated method of synchronization.

Such a device may be used, for example, in a receiver in a UMTS (Universal Mobile Telecommunication System) application on a downlink physical channel, a mobile station being the receiver and a base station being the transmitter. In UMTS, the synchronization code is mapped into a Primary Synchronization CHannel (PSCH).

BACKGROUND OF THE INVENTION

A Base Station (BS) transmits information to mobile receivers through physical channels, in a zone around the BS called cell. All BS are asynchronous with each other. When a mobile station (MS) is switched on, it tries to get information from one BS, and thus needs to get synchronized to one BS. This operation is called initial cell search, or synchronization, or even initial acquisition of the synchronization code.

A physical channel typically consists of a layered structure of frames and time slots. Time slots are units containing chips and are part of a larger structure called frame. The primary synchronization channel (PSCH) is mapped into a physical channel. Said PSCH consists of a modulated synchronization code, which is transmitted once at the beginning of every slot in a frame from the BS to the MS. The MS receives the synchronization code within a sequence of data, which also comprises noise due to the transmission channel. This noise is mainly due to signals belonging to other physical channels, or to signals being transmitted by other BS.

The first step of synchronization, called slot search, is to acquire the slot timing. In order to acquire slot timing, it is suggested in the specifications 3G TS 25.214 V3.1.1 page 38, edited by the 3GPP group ($3^{rd}$ Generation Partnership Project), to make a total correlation between, on the one hand, a synchronization code locally generated by the MS, and, on the other hand, the sequence of data received by the MS, which comprises the synchronization code sent by the base station. The resulting correlation signal comprises in particular a correlation peak when the 2 codes are in synchronization, and a noise peak if the noise power is too high. The maximum of the correlation peaks found then determines the slot timing searched for.

All physical channels are transmitted at a particular carrier frequency. Both the BS and the MS use a local oscillator to modulate or demodulate the transmitted information. Whereas the local oscillator of the BS has an almost fixed frequency F of accuracy within +−0.1 ppm, the local oscillator of the MS can have a frequency F' of accuracy within +−15 ppm in order to reduce cost of said MS. In an UMTS application, the physical channel has a carrier frequency of 2 GHz. This implies a high frequency offset up to +−30 KHz between frequency F and frequency F', frequency F' being higher or lower than F. Said high frequency offset degrades the computed correlation signal, as it implies an amplitude decrease of the correlation peak when codes are in phase. Therefore the maximum of the correlation signal could correspond to a noise peak, giving a wrong slot timing. Moreover, at some particular frequency offsets, the desired correlation peak is suppressed, so synchronization becomes impossible. More generally, beyond a particular high frequency offset, synchronization becomes very difficult. Therefore, the use of the classical correlator is restricted to frequency offsets accurring within a frequency bandwidth of +−7.5 KHz, in order to enable synchronization in a reduced time.

SUMMARY OF THE INVENTION

Accordingly, it is an object of the invention to provide a device for the synchronization of a DS-CDMA receiver with a synchronization code being sent periodically and discontinuously by a DS-CDMA transmitter, which also enables to solve the problem of high frequency offset while making said synchronization.

To this end, according to one embodiment of the invention, there is provided a device comprising:

partial correlation calculation means for applying partial correlation to the received sequence of data using the synchronization code and for providing output correlation signals, transform computation means for applying a transform to said output correlation signals and for providing output complex signals, a square absolute value circuit for calculating the square of absolute values of said output complex signals, slot-wise non-coherent integration means for applying a non-coherent integration on said square absolute values, selecting means for selecting a maximum between the integrated values.

According to another embodiment of the invention, there is provided a method of synchronization, said method comprising the steps of:

applying partial correlation to the received sequence of data using the synchronization code and providing output correlation signals, applying a transform to said output correlation signals and providing output complex signals, calculating the square of absolute values of said output complex signals, applying a non-coherent integration to said square absolute values, selecting a maximum from the integrated values.

As we will see in detail further on, the invention speeds up the synchronization time in the case of high frequency offset while keeping a reasonable hardware complexity. This is due to the fact that the device according to the invention has a correlation gain, which is less degraded by frequency offsets. The correlation gain is defined as being the ratio between the correlation peak when codes are in phase, and the average of other correlation values. The higher the gain is, the higher the desired correlation peak is, compared to the noise peaks. Thus, the probability to detect the right correlation peak is higher and said synchronization is easier.

In addition, the invention provides an estimate of the frequency offset, thus making the following steps of synchronization easier.

BRIEF DESCRIPTION OF THE DRAWINGS

Additional objects, features and advantages of the invention will become apparent upon reading the following detailed description and upon reference to the accompanying drawings, in which.

DETAILED DESCRIPTION OF THE EMBODIMENT(S)

In the following description, well-known functions or constructions by the man skilled in the art are not described in detail since they would obscure the invention in unnecessary detail.

Figure 1:
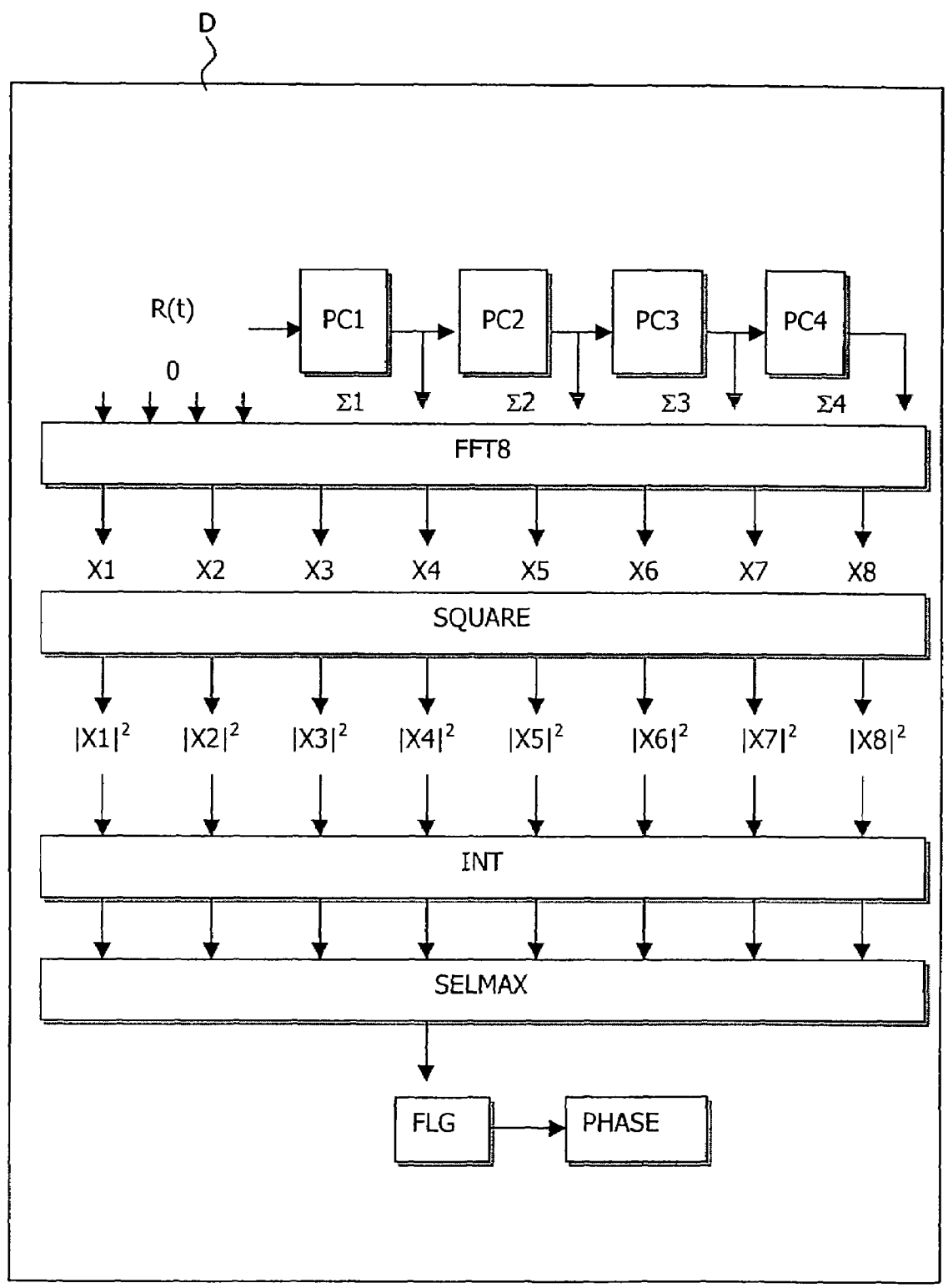
FIG. 1 is a schematic diagram which shows a device for synchronization according to one embodiment of the invention.

The present invention relates to a device D for synchronizing a DS-CDMA receiver with a synchronization code being sent periodically and discontinuously by a DS-CDMA transmitter. FIG. 1 is a schematic diagram of said device D.

The device D is comprised in the DS-CDMA receiver. An example of wireless communication in an UMTS application is taken on a downlink transmission where the DS-CDMA receiver is a UMTS receiver, here a mobile station and the transmitter is a base station. In this example, a received data R(t) corresponds to one chip duration. The device D comprises correlation calculation means PC, transform computation means FFT8, a square absolute value circuit SQUARE, slot-wise non-coherent integration means INT and maximum selecting means SELMAX.

Figure 2:
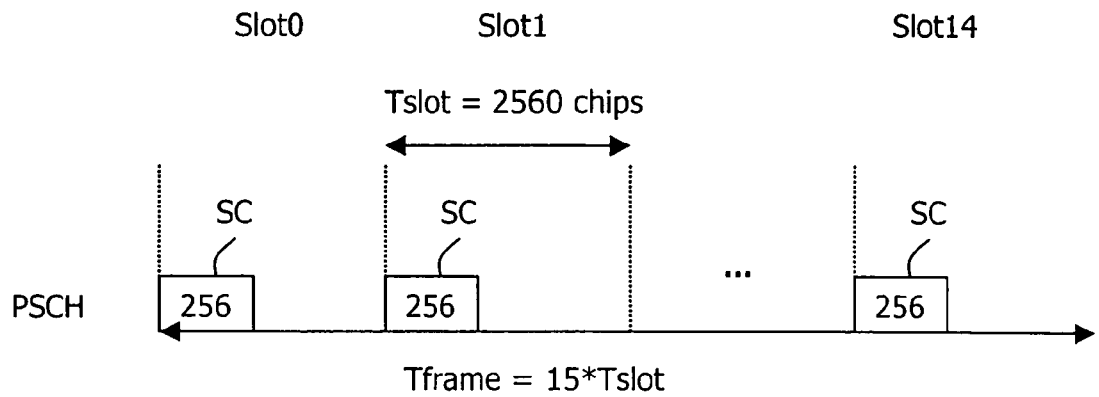
FIG. 2 is a timing diagram of a sequence of data transmitted by a transmitter to the device of FIG. 1

The base station sends a synchronization code SC 256 chips in length to the mobile station over a primary synchronization channel PSCH once every time slot of 2560 chips, as shown in FIG. 2. A frame lasts 10 ms and comprises 15 time slots. The mobile station receives a sequence of data R(t); said sequence comprises the synchronization code SC sent by the base station, and noise. The mobile must synchronize with the base station in order to get information from the BS. Therefore, said mobile station has to know the time when said base station sends the synchronization code SC.

The synchronization is effected as follows. It comprises five stages; the first two stages are based on the prior art "a fast acquisition technique for a direct sequence spread spectrum signal in the presence of a large Doppler shift" written by Stirling-Gallacher, Hulpert and Povey.

In a first stage 1), the partial correlation means PC apply partial correlation to the received sequence of data R(t). The partial correlation means has a total length of m=256 chips, which corresponds to a synchronization code SC length.

The partial correlation means PC preferably comprise N (N≧1) partial correlators of length x, such that Nx=m. Each partial correlator number n (n=0 ... N−1) gives an output correlation signal $\Sigma x(t)$ for each received data R(t) at a discrete time t:

$$\sum x(t) = \sum_{i=0}^{x-1} R(t+i+n*x) * SC(t+i+n*x)$$

where i goes from 0 to (x-1) chips. The term SC in the above formula is a synchronization code locally generated by the mobile station. Such an output correlation signal comprises a correlation peak when two correlated synchronization codes SC are in phase, i.e. synchronized (the first one being generated by the base station and the second one by the mobile station). The outputs of the N correlators are fed to a P-point transform (P≧0).

In a second stage 2), the transform computation means FFT8 apply a transform computation to said output correlation signals $\Sigma x$. Said transform computation means FFT8 are preferably a P-point Fast Fourier transform FFT. The P-point Fast Fourier transform provides P complex output signals X1 to XP in the frequency domain, which have a phase and an amplitude. One first advantage of using partial correlators in combination with a P-point Fast Fourier transform (FFT) is that the correlation gain is better on a wider frequency bandwidth. Said correlation gain G is defined as being the ratio between the correlation peak when codes are synchronized and the average of other values of the correlation signal. Another advantage is the possibility of having a frequency offset estimate, as the outputs of the FFT belong to the frequency domain. When the correlated codes are in phase, the correlation peak will appear at one output of the FFT only, depending on the frequency offset. Each output corresponds to a particular frequency range. Therefore, the output of the FFT where the maximum of the correlation is found gives directly the frequency offset range.

Choice of parameters N (number of correlators) and P (number of points of the FFT) for stages 1) and 2):

A normalized correlator gain of zero is achieved when there is a $2\pi$ phase difference between the first and last chips within one correlator and when the correlator output yields zero. This occurs at frequencies=+−Fc/x instead of +−Fc/m for a simple partial correlator. Hence, Fc/x is called the frequency bandwidth for which a decrease of the correlation peak is not too important, preferably less than 3 db compared to a maximum found. The normalized correlation gain is defined as being the ratio between the maximum of the correlation peaks and the average of other values of the correlation signal when there is no noise.

In order to have a frequency bandwidth Fc/x=60 KHz that corresponds to +−15 ppm and to a frequency offset up to +−30 KHz, N=4 partial correlations of x=64 chips length are performed and taken as 4 FFT inputs. Thus, as a receiver in an UMTS system has a chip rate equal to 3.84 Mchip/sec, that is to say a chip frequency equal to 3.84 MHz, Fc/x=3.84/64=0.060 MHz=60 KHz.

In a first embodiment a 4-point Fourier transform is applied. But a 4 point FFT provides a bad frequency resolution. The resolution is defined in relation to the frequency interval between two consecutive outputs of the FFT. The higher the resolution is, the lower said frequency interval will be, and the more precise an estimate of the frequency offset will be.

Contrary to the prior art related to the "fast acquisition technique" mentioned above, the synchronization code SC is discontinuous because it is sent once every slot in a frame, and its length is only 256 chips. Therefore it reduces the possibilities of getting more inputs for the Fast Fourier transform FFT, and having a high resolution, as the additional inputs can not correspond to outputs of other correlators.

In order to increase the resolution of the Fourier transform, in a second preferred embodiment, an 8-point Fourier transform is applied. The first 4 FFT inputs are connected to the 4 correlators outputs, whereas the last 4 FFT inputs are set to zero. The 8-point FFT computation gives 8 complex output signals X1 to X8.

This provides finer estimate of the frequency offset. For example, if the first output X1 is chosen, with an 8-point FFT the frequency interval will be around +−3.75 KHz, whereas it will be around +−8 KHz with a 4-point FFT.

It can be noted that although the 8-point FFT increases the complexity of the device D, the 8-point FFT can be simplified much by taking into account that half of the inputs are zeros. If the operations needed for said 8-point FFT are combined properly, only additions and four multiplications are needed for one set of 8 outputs X1 to X8 of said 8-point FFT.

In a third stage 3), the square absolute value circuit SQUARE calculates the square of absolute values of said 8 complex output signals X1 to X8. The square absolute value gives the amplitudes of said complex outputs. The phases are not used here.

In a fourth stage 4), the slot-wise non-coherent integration means INT apply a non-coherent integration to said square absolute values obtained in stage 3. That is to say, the square absolute values of stage 3 are accumulated separately on a number M of slots in 8 separate buffers of 2560 chips length. The number M is chosen in relation to an error probability we want to reach as shown further on. The higher the number M is, the lower the error probability is.

The outputs are 8 accumulated values V.

Said integration stage has the advantage of decreasing the noise effect so that correlation peaks clearly appear. Thus the correlation gain is increased. The higher the gain, the higher the amplitude will be, compared to noise peaks. Without this integration stage, the correlation gain G is too low, as the synchronization code length (256 chips) and the partial correlators length (64 chips) are small. It can be noted that advantageously the buffers can be shared with other devices of the UMTS receiver in order to reduce the increase of buffer requirements because of said integration. For example, another UMTS device is a device that carries out a well known operation of de-interleaving.

In a fifth stage 5), the selecting means SELMAX scans the whole contents of the 8 buffers, and selects the maximum from all the 2560*8 integrated values V which are in the 8 buffers. The selection determines an index IMAX in a buffer comprised between the values 0 and 2559. The maximum selected determines, on the one hand, the relative timing ΔT of a time slot, and, on the other hand, an estimate of the frequency offset between the first frequency F of the base station and the second frequency F' of the mobile station.

The index IMAX of the selected maximum inside one of the 8 buffers corresponds to the slot timing ΔT in chips: ΔT=IMAX*Tchip, where Tchip corresponds to the chip duration in seconds. This timing is relative to the time T0 when the accumulation in the buffers started.

For the frequency estimate, the frequency offset corresponding to the maximum selected is taken from the following table.

| FFT8 output | Frequency offset range |
|---|---|
| X1 | −3.75 kHz to +3.75 kHz |
| X2 | +3.75 kHz to +11.25 kHz |
| X3 | +11.25 kHz to +18.75 kHz |
| X4 | +18.75 kHz to +26.25 kHz |
| X5 | +26.25 kHz to +30 kHz or −30 kHz to −26.25 kHz |
| X6 | −26.25 kHz to −18.75 kHz |
| X7 | −18.75 kHz to −11.25 kHz |
| X8 | −11.25 kHz to −3.75 kHz |

When the fifth output X5 is selected as the maximum, it could correspond to a positive or negative frequency offset. Therefore, the device D preferably comprises a flag FLG and a phase detector PHASE to determine the sign of the frequency offset. When said fourth output is selected, the device D enables said flag to activate the phase detector. The phase detector will look at the phase of the complex output X5 of the 8-point FFT.

Thus, the estimate of the frequency offset can be used to correct the second frequency F' of the local oscillator of the mobile station for the next synchronization steps. If there is no correction, other errors will appear in the next steps. The next steps of synchronization are in particular a frame synchronization and a scrambling code identification as described in the 3G TS 25.214 V3.1.1 specifications.

Hence, a fast and good synchronization between the mobile station and a base station can be made.

Thus, compared to the prior art and especially to the prior art "fast acquisition technique" which is carried out only by a square stage and a selection of a maximum just after, without any accumulation, the method according to the invention has the advantages to give higher performance but also an estimate of the frequency offset between the mobile station and the base station.

Performance Comparison with Other Methods.

Figure 3:
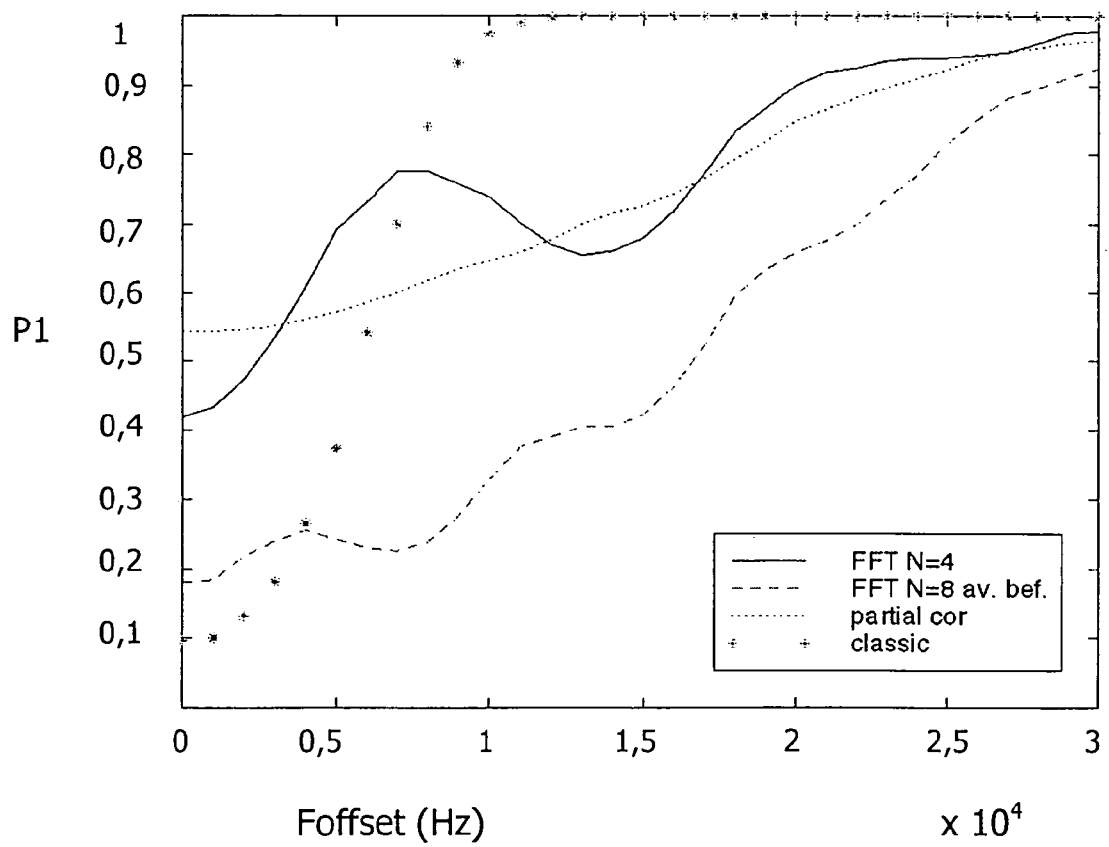
FIG. 3 is a first graph showing first performance results of the device according to the embodiment of the invention of FIG. 1.
Figure 4:
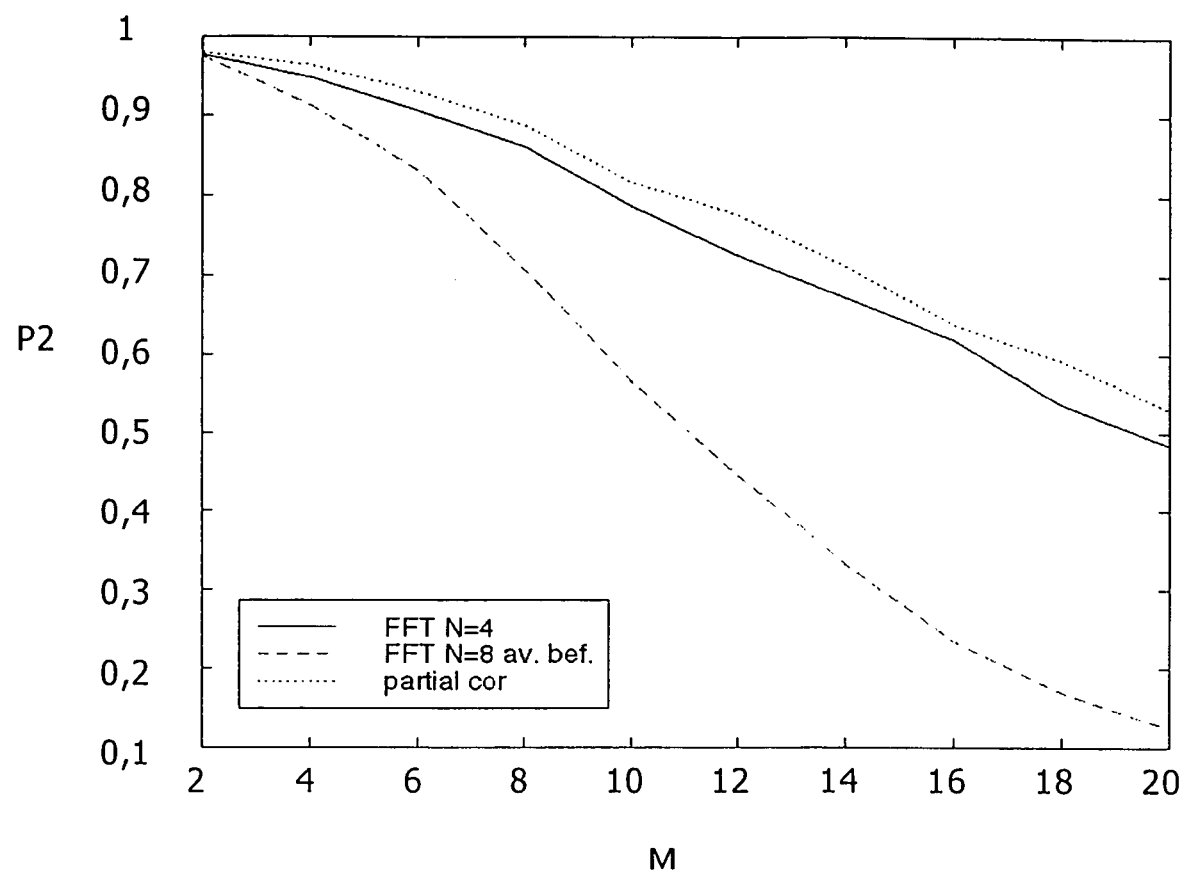
FIG. 4 is a second graph showing second performance results of the device according to the embodiment of the invention of FIG. 1.

FIG. 3 and FIG. 4 show the performance of the method according to the invention compared to other methods for synchronization on a primary synchronization channel PSCH. Said primary synchronization channel is characterized by the signal/noise ratio PSCH_Ec/Ior and the transmission channel is characterized by the signal/noise ratio Ior/Ioc with:

PSCH_Ec=energy per chip of the primary synchronization channel PSCH,

Ior=total power transmitted by the base station comprising the powers of all physical channels on said base station, Ioc=total power received by the mobile station comprising the power of said base station and noise coming from other base stations.

In FIG. 3, the primary synchronization channel is characterized by PSCH_Ec/Ior=−13 db and the transmission channel is characterized by Ior/Ioc=−2 db, whereas in FIG. 4, PSCH_Ec/Ior=−13 db and Ior/Ioc=−5 db. These characteristics act upon the performances of the different methods shown hereinafter. The correlation gain G decreases while the noise increases. Thus, for Ior/Ioc=−2 db, the correlation gain G is more important than for Ior/Ioc=−5 db.

In FIG. 3, a first graph shows the performance in terms of probability P1 of incorrect synchronization of the method according to the invention "FFT N=8 av.bef." (8 Point FFT with averaging before choice of maximum) compared to the following methods.

a classic method with a total length correlation of 256 chips called "classic", a 4 partial length correlation method called "partial", with a sum of 4 partial correlations after square absolute value computation, followed by non-coherent integration, a 4 FFT point correlation method called "FFT4", with non-coherent integration after the selection of the maximum between the 4 FFT outputs. It corresponds to the prior art "fast acquisition technique" with an extra non-coherent integration.

For all these methods, a decision is taken after the same number M of slots of non-coherent integration. Then we compare the slot timing found by each method with a reference slot timing of the base station, to determine if the slot synchronization was correct or incorrect.

Said first graph shows in particular the probability P1 of incorrect slot synchronization as a function of a frequency offset. This error probability is directly correlated to an average acquisition time, as it will take more time to repeat the process if initial acquisition fails. The classic method has the best performance up to around 4 KHz, then it degrades quickly with increasing frequency offsets. Over 10 KHz, it is almost impossible to synchronize in a reasonable time. As can be seen in FIG. 3, the method of synchronization according to the invention has the best performance on a wide interval of frequency offsets.

In FIG. 4, a second graph shows the performance in terms of probability P2 of fast synchronization of the method according to the invention compared to the two methods "partial" and "FFT4" mentioned last.

Said second graph shows in particular the probability P2 of incorrect slot synchronization as a function of the number M of slots needed for non-coherent integration. The lower the correlation gain G of a method is, the more the number M of accumulations are necessary. Hence, the slower a method is. Thus, to achieve less than 55% of probability of incorrect slot synchronization, the method and device according to the invention need less than 10 time slots, whereas the other methods need 18 or 19 time slots. In conclusion, the method according to the invention is almost two times faster than the two other methods mentioned before.

It is to be understood that the present invention is not limited to the aforementioned embodiments, and variations and modifications may be made without departing from the spirit and scope of the invention as defined in the appended claims.

The invention claimed is:

1. A device (D) for the synchronization a DS-CDMA receiver with a synchronization code being sent periodically and discontinuously by a DS-CDMA transmitter, said device comprising:

partial correlation calculation means (PC) for applying partial correlation to the received sequence of data using the synchronization code and for providing output correlation signals, transform computation means (FFT8) for applying a transform to said output correlation signals and for providing output complex signals, a square absolute value circuit (SQUARE) for calculating the square of absolute values of said output complex signals, slot-wise non-coherent integration means (INT) for applying a non-coherent integration on said square absolute values, selecting means (SELMAX) for selecting a maximum between the integrated values.

2. A device (D) as claimed in claim 1, characterized in that the transform computation means are 8-point fast Fourier transform means.

3. A device (D) as claimed in claim 2, characterized in that the 8-point Fourier transform means receive four output correlator signals as inputs and four zeros as inputs.

4. A device (D) as claimed in claim 1, characterized in that the maximum selected is able to determine a relative timing of a time slot for synchronization.

5. A device (D) as claimed in claim 1, characterized in that the maximum selected is able to determine an estimate of a frequency offset between the receiver and the transmitter.

6. A device (D) as claimed in claim 1, characterized in that the DS-CDMA receiver is a UMTS receiver.

7. A method of synchronizing a DS-CDMA receiver with a synchronization code being sent periodically and discontinuously by a DS-CDMA transmitter, said method comprising the steps of:

applying partial correlation to the received sequence of data using the synchronization code and providing output correlation signals, applying a transform to said output correlation signals and providing output complex signals, calculating the square of absolute values of said output complex signals, applying a non-coherent integration on said square absolute values, selecting a maximum between the integrated values.

8. A method as claimed in claim 7, characterized in that the transforming step is an 8-point fast Fourier transforming step.

9. A method as claimed in claim 8, characterized in that the 8-point Fourier transforming step uses four output correlator signals as inputs and four zeros as inputs.

10. A method as claimed in claim 7, characterized in that it comprises another step of determining, with the maximum selected, a relative timing of a time slot for synchronization.

11. A method as claimed in claim 7, characterized in that it comprises another step of determining, with the maximum selected, an estimate of a frequency offset between the receiver and the transmitter.

12. A method as claimed in claim 7, characterized in that the DS-CDMA receiver is a UMTS receiver.

* * * * *